US011679421B2

United States Patent
Zhao et al.

(10) Patent No.: US 11,679,421 B2
(45) Date of Patent: Jun. 20, 2023

(54) RIGID-FLEXIBLE OPERATION INTEGRATED MULTI-FUNCTION ENGINEERING RESCUE EQUIPMENT

(71) Applicant: BEIJING UNIVERSITY OF TECHNOLOGY, Beijing (CN)

(72) Inventors: Jing Zhao, Beijing (CN); Zichen Song, Beijing (CN); Ziqiang Zhang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 17/827,977

(22) Filed: May 30, 2022

(65) Prior Publication Data
US 2022/0297166 A1 Sep. 22, 2022

Related U.S. Application Data

(63) Continuation of application No. PCT/CN2021/094248, filed on May 18, 2021.

(30) Foreign Application Priority Data

Mar. 16, 2021 (CN) .......................... 202110279676.9

(51) Int. Cl.
*B08B 1/00* (2006.01)
*A62B 3/00* (2006.01)
(Continued)

(52) U.S. Cl.
CPC .............. *B08B 1/04* (2013.01); *A62B 3/005* (2013.01); *B08B 1/002* (2013.01); *B25J 9/144* (2013.01);
(Continued)

(58) Field of Classification Search
CPC . A46B 3/005; B08B 1/04; B08B 1/002; B25J 11/0085; B25J 15/0019; B25J 15/0052
(Continued)

(56) References Cited

U.S. PATENT DOCUMENTS 796,842 A * 8/1905 Hoffmann et al. ...... B66C 1/485
414/673
2,713,419 A * 7/1955 Hayes ...................... C03B 9/447
209/532
(Continued)

FOREIGN PATENT DOCUMENTS

CN 205776018 U 12/2016
CN 106677234 A * 5/2017 ................ E02F 3/28
(Continued)

OTHER PUBLICATIONS

CN-106677234-A translation description Espacenet (Year: 2023).*
CN-110185283-A translation description Espacenet (Year: 2023).*
International Search Report of PCT/CN2021/094248.

*Primary Examiner* — Don M Anderson
*Assistant Examiner* — Timothy Brady
(74) *Attorney, Agent, or Firm* — J.C. Patents

(57) ABSTRACT

The invention discloses a multifunctional rigid-flexible operation engineering rescue accessory. The accessory comprises a frame, two working hydraulic cylinders, eight gripping device connecting rods, two gripping claws, a flexible cleaning device base, a movable guide sleeve, a guide slider, a guide slider rail, a rotary guide sleeve, eight sweepers brush, a functional hydraulic cylinder, and a working hydraulic motor. A gravel clearing function and a stone grabbing function are achieved by using one accessory, and different from a traditional engineering accessory integrating rigid movement, the accessory has the advantage of integrating rigid operation and flexible operation. A rigid grabbing system and a flexible sweeping system are
(Continued)

arranged outside the frame and in the cavity of the frame respectively, so as to realize function conversion; through pushing out and retracting of a piston of the functional hydraulic cylinder, the sweeping brushes can be pushed out of the cavity to work and retract to be hidden so that the grabbing function and the sweeping function can be rapidly converted; and moreover, working requirements in various working states are met, and motion interference is avoided.

9 Claims, 13 Drawing Sheets

(51) Int. Cl.
   *B25J 15/00* (2006.01)
   *B08B 1/04* (2006.01)
   *B25J 9/14* (2006.01)
   *B25J 15/02* (2006.01)
(52) U.S. Cl.
   CPC ........ *B25J 15/0009* (2013.01); *B25J 15/0206* (2013.01)

(58) Field of Classification Search
   USPC ............................................... 15/28; 414/626
   See application file for complete search history.

(56) References Cited

U.S. PATENT DOCUMENTS

| 5,066,189 | A | * | 11/1991 | Shell | ........................ | B66C 3/04 |
|---|---|---|---|---|---|---|
| | | | | | | 414/811 |
| 10,315,290 | B2 | * | 6/2019 | Akashi | .................... | B24D 13/16 |
| 2005/0097690 | A1 | * | 5/2005 | Kaiser | ..................... | B08B 1/007 |
| | | | | | | 15/21.1 |
| 2005/0153642 | A1 | * | 7/2005 | Matsushita | .......... | A46B 13/008 |
| | | | | | | 451/526 |
| 2017/0190055 | A1 | * | 7/2017 | Zhao | ...................... | B23D 33/00 |
| 2021/0354216 | A1 | * | 11/2021 | Zhao | ...................... | B23D 15/14 |

FOREIGN PATENT DOCUMENTS

| CN | 106677234 | A | | 5/2017 |
|---|---|---|---|---|
| CN | 107953325 | A | | 4/2018 |
| CN | 109454645 | A | | 3/2019 |
| CN | 109483584 | A | | 3/2019 |
| CN | 110185283 | A | * | 8/2019 |

* cited by examiner

RIGID-FLEXIBLE OPERATION INTEGRATED MULTI-FUNCTION ENGINEERING RESCUE EQUIPMENT

CROSS-REFERENCE TO RELATED APPLICATIONS

This application is a continuation of International Application No. PCT/CN2021/094248, filed on May 18, 2021, which claims priority to Chinese Patent Application No. 202110279676.9, filed on Mar. 16, 2021. The above applications are hereby incorporated by reference in their entireties.

TECHNICAL FIELD

The invention relates to the technical fields of mechanical design, hydraulic control, earthquake resistance and disaster reduction, and specifically relates to a multifunctional engineering rescue accessory.

BACKGROUND ART

In recent years, earthquake have occurred frequently which caused construction of national economic and the safety of people's lives. Therefore, it is of great significance to use efficient post-earthquake disaster relief accessory for disaster relief work in the disaster area. Referring to the current earthquake relief and rescue, it can be seen that the rescue tools mainly used by rescuers and the large-scale general engineering machinery deployed include hydraulic clamps, rock grabs, hydraulic shears, rock saws, and breakers. By analyzing and classifying the rescue accessory with different functions, it can be determined that the crushing and handling of reinforced concrete walls is the main work of the engineering rescue accessory. Rigid operation is the main working method used for crushing and handling of reinforced concrete walls, this kind of method may causes a secondary collapse and endanger the lives of the trapped persons, and after the rigid operation, there is no guarantee that the rescue site can be directly followed up for rescue. It requires the rescue team to clean the small concrete gravel manually which the aftershocks and secondary collapses may occur during the manual cleaning process to endanger the lives of rescuers. In addition, double-arm structures are used in most of the accessory to achieve multi-function operations, and the specific realization is that a single mechanical arm is equipped with a single accessory to work. This solution has disadvantages such as inconvenience, difficulty in manufacturing, and high cost. Therefore, the realization of one machine with multiple functions has practical significance for the demolition work or economic construction after the disaster. There is a need to design a new type of multifunctional accessory that has both rigid and flexible operation.

SUMMARY

The purpose of the present invention is to realize an accessory that have both rigid operation for holding concrete stones and flexible operation for cleaning rubble.

A multifunctional rigid-flexible operation engineering rescue accessory includes a frame (1), two working hydraulic cylinder (2), eight gripping device connecting rods (3), and two gripping claws (4), a flexible cleaning device base (5), a movable guide sleeve (6), a guide slider (7), a guide slider rail (8), a rotary guide sleeve (9), eight sweepers brush (13), a functional hydraulic cylinder (15), and a working hydraulic motor (17); the working hydraulic cylinder (2), the functional hydraulic cylinder (15), and the working hydraulic motor (17) control the movement through control equipment.

The frame (1) is a cuboid, the direction perpendicular to the cuboid is called x-axis direction, the axis parallel to the central symmetry axis of the cuboid is z-axis, the axis perpendicular to the x-axis and z-axis is y-axis, and the direction of z-axis is Up and down; the center of the cuboid is designed with two cylindrical cavities, upper cylindrical cavity and lower cylindrical cavity, directions of the two cylindrical cavities are along the z-axis. The upper cylindrical cavity which not pass through the frame is used to arrange the working hydraulic motor (17), the lower part of upper cylindrical cavity connect the lower cylindrical cavity, and there is a boss used for installing the fixed hydraulic motor (17); the lower cylindrical cavity is used to arrange the flexible cleaning device base (5) and other flexible cleaning device parts. The upper part of the lower cavity is connected with the upper cavity to ensure the connection between flexible cleaning device base (5) and the working hydraulic motor (17), the lower part of the lower cavity pass through the frame (1) to ensure that the sweep brush (13) can be pushed out of the frame (1). The cavity is designed with bosses on the opposite sides in y-axis direction to Install the guide slide rail (8) and the functional hydraulic cylinder (15); the top of the cuboid is designed with two bosses which are connected by two crossbars along x direction for connecting with the quick changeover joint; Two bosses along the y-axis direction are designed on both sides of the cuboid. The center of the boss is reserved with a rectangular groove to ensure moving space of the working hydraulic cylinder (2). Both sides of the boss are designed with through holes along the X axis for Installing the working hydraulic cylinder (2).

The flexible cleaning device base (5) is composed of three cylinders with different diameters and heights. The center lines of the three cylinders are on the same line along the z-axis; the upper cylinder is used as the rotating shaft (51) to connect flexible cleaning device base (5) and the working hydraulic motor (17), it is designed with splines (53); the middle cylinder is designed with eight through holes (52) for fixing the connecting rod (92) of the rotating guide sleeve (9), the cylinder is designed with a cylindrical cavity used for placing the retracted sweeping brush (13), it is projected as a regular octagon in z-axis direction, and the penetration direction of the cavity is parallel to the z-axis; the lower cylinder is a cylindrical cavity structure, and the bottom is designed with eight rectangular grooves (54) for fixing the sweeping brush (13) that extends after the cleaning work starts. Columnar rollers (12) are installed at the junction of the groove (54) and internal cavity.

The movable guide sleeve (6) is a cylindrical ring structure, the center of the cylinder is designed with a circular through hole along the z-axis direction, and the inner side of the circular through hole is designed with an annular groove (62), and the plane of the groove is perpendicular to the z-axis; Two bosses are designed on the opposite sides of the sleeve along the y-axis direction; the bosses (63) extend outward from the right side of the moving guide sleeve (6) along the positive direction of the y-axis, and are designed with grooves to connect with the functional hydraulic cylinder (15); the boss (61) extends downward from the left side of the moving guide sleeve (6) along the negative direction of the z-axis, and is designed with a through hole for connecting with the guide slider (7).

The rotating guide sleeve (9) is a cylindrical ring structure, the center of the cylinder is designed with a circular through hole along the z-axis direction; the outer side of the cylinder is designed with an annular groove (91) for mounting the bearing, and the plane of the annular groove (91) is perpendicular to the z-axis; the bottom of the cylinder is designed with eight cylindrical connecting rods (92) along the z-axis for connecting the sweeping brushes (13), and the eight cylindrical connecting rods (92) are evenly distributed on the circumference to rotate the guide sleeves (9); the bottom of each cylindrical connecting rod (92) is designed with a circular through hole (93) for installing the sweeping brush (13).

The lower end cover (11) of the box body is a sheet-shaped cuboid, the center of the cuboid is designed with a circular through hole along the z-axis direction, and the upper surface of the cuboid is designed with an annular boss for mounting and fixing the bearing; the dust cover (14) is octagon column, the center of each edge of the octagon is designed with a rectangular groove (141) to fix the sweeping brush (13) that protrudes from the cavity during work. The inner edge of the groove (141) is designed with a circular through hole; sweeping brush (13) is a rectangular parallelepiped, and its surface is covered with a flexible steel wire brush.

The rigid gripping system includes a frame (1), two working hydraulic cylinders (2), eight gripping device connecting rods (3), two gripping claws (4), etc.; each of the gripping claw (4) has a block structure with sickle cross-section which is perpendicular to the x-axis. The tip of the sickle-shaped cross-section of each paw is facing down and the wide end is on the top; one of the claws consists of three claws with a sickle-shaped cross-section along the x-axis, and the three claws are connected by a columnar structure; the other claw to be grasped is composed of two claws with a sickle-shaped cross section arranged along the x-axis direction, and the two claws are also connected by a columnar structure. when the two gripping claws (4) work, each of the claws is staggered and gripped; the upper side of each gripping claw (4) which vertical to the sickle surface is designed with a fixed connection rod, the length of the connecting rod is along the y-axis direction, one end of the connecting rod is connected with the frame (1) for the connection of rotation pair A, the rotation axis of the rotation pair A is parallel to the x-axis, and the connecting rod can only rotate in the circumferential direction; The center of each sickle-shaped claw of the gripping claw (4) is designed with a boss along the x-axis direction. The boss is located between the wide end and the tip end in the z-axis direction. The center of the boss is designed with a circular through hole to connect connecting shaft "a" in the y-axis direction for the connection of rotation pair B, and the rotating shaft of this rotation pair B is parallel to the rotating shaft of the above-mentioned rotation pair A; both ends of the connecting shaft "a" are connected to the gripping device connecting rod (3) for the connection of rotation pair B; one end of the connecting rod and the gripping claw (4) forms a rotation pair B, and the other end is connected with the connecting rod and the connecting shaft "b" for the connection of the rotation pair C, the rotating shaft of the rotation pair C is parallel to the x-axis; the center of the connecting shaft "b" through the sleeve and the working hydraulic cylinder (2) for the connection of rotation pair C; one end of the connecting rod and the connecting rod of the gripping device (3) forms a rotation pair C, and the other end is connected with the frame (1) for the connection of rotation pair D, the rotating shaft of the rotation pair D is parallel to the x-axis; the working hydraulic cylinder (2) is connected with the bosses on both sides of the frame (1) through a pin shaft for the connection of rotation pair E, and the rotation shaft of the rotation pair E is parallel to the x-axis; the working hydraulic cylinder (2) drives the connecting shaft "b" to move during the movement, so as to push the four-bar mechanism composed of the gripping claw (4) and the gripping device connecting rod (3) to move, thereby changing the position of the gripping claw (4) to realize the gripping function.

The flexible cleaning system includes a flexible cleaning device base (5), a movable guide sleeve (6), a guide slider (7), a guide slider rail (8), a rotating guide sleeve (9), and a rotating base bearing (10), one frame box end cover (11), eight cylindrical rollers (12), eight sweeping brushes (13), one dust cover (14), one functional hydraulic cylinder (15), a rotating sleeve bearing (16), a working hydraulic motor (17), etc.; the lower end of the flexible cleaning device base (5) connects the frame (1) through a frame box end cover (11) and bearing (10), the frame box end cover (11) is fixed with the outer ring of the bearing (10), the inner ring of the bearing (10) is fixed to the outside of the lower end of the base (5), and the frame box end cover (11) is bolted on the frame (1); the rotating shaft (51) of the flexible cleaning device base (5) passes through the through hole in the center of the rotating guide sleeve (9) to connect with the working hydraulic motor (17) through the rotating shaft spline (51); The cylindrical roller (12) is connected with the rectangular groove (54) at the lower end of the flexible cleaning device base (5) for a rotation pair connection, the cylindrical roller (12) are arranged in a circular curve; the cylindrical connecting rod (92) at the lower end of the rotating guide sleeve (9) pass through the circular hole (52) to connect with the sweeping brush (13), the connecting rod connects with the sweeping brush through the connecting rod hole (93) to form a rotation pair, and a torsion spring is designed at the connection to apply external force, which makes the sweeping brush (13) pressed on the surface of the cylindrical roller (12) to ensure the sweeping brush (13) is pushed out from the cavity and expand; the bearing (16) is installed between the moving guide sleeve (6) and the rotating guide sleeve (9), the outer ring of the bearing (16) is fixedly installed in the annular groove (62) of the moving guide sleeve (6), and the inner ring of the bearing (16) is fixedly installed in the annular groove (91) of the rotating guide sleeve (9). Therefore, the movable guide sleeve (6) and the rotating guide sleeve (9) can be rotated relative to each other; the boss (61) is fixed with the guide slider (7) by screws; the guide slider rail (8) is fixed on the cavity wall of the frame (1) by bolt; the guide slider (7) is connected with the guide slider rail (8) as moving pairs; the boss (63) is fixedly connected with the piston rod of the functional hydraulic cylinder (15); dust cover (14) is fixedly connected with the cylindrical connecting rod (92) at the lower end of the rotating guide sleeve (9) through the circular through hole on the surface; the functional hydraulic cylinder (15) is fixedly installed on the inside of the cavity of frame (1) by bolts; the working hydraulic motor (17) is fixedly installed on the boss between the upper cavity and the lower cavity of the frame (1) by bolts; when the piston of the functional hydraulic cylinder (15) is pushed out, the moving guide sleeve (6) is pushed upward along the positive direction of z-axis, thereby driving the rotating guide sleeve (9) to move upwards synchronously, and driving the sweeping brush (13) into the cavity; when the piston of the functional hydraulic cylinder (15) is retracted, it drives the moving guide sleeve (6) to move downward along the negative direction of z-axis, thereby driving the rotating guide sleeve (9) to move down synchronously, and driving the sweeping brush (13) to be pushed out from the cavity; the working hydraulic motor (17) drives the flexible cleaning base (5) of the sweeping device rotates, thereby driving the sweeping brush (13) located in the rectangular groove (54) to rotate. The rotation of the base drives the rotating guide sleeve (9) to rotate synchronously. At this point, the moving guide sleeve (6) is fixed and stationary, while the rotary guide sleeve (9) rotates relative to it.

The invention has a rigid gripping device A and a flexible cleaning device B.

When working as a rigid gripping device A, the functional hydraulic cylinder (15) piston is pushed out and locked, the sweeping brush (13) is retracted and hidden in the cavity of the flexible cleaning device base (5), and the working hydraulic cylinder (2) piston is pushed out to provide the power pushes the connecting shaft move to drive the four-bar mechanism composed of the gripping claw (4) and the gripping device connecting rod (3). The gripping claw (4) moves in a curve until the two holding claws grasp together, and does not intersect with the protruding part at the bottom of the flexible cleaning device base (5), so as to realize the rigid holding and grasping function of stones.

When working as the flexible cleaning device B, the piston of the functional hydraulic cylinder (15) is retracted and locked, the sweeping brush (13) is pushed out and expanded from the cavity of the flexible cleaning device base (5); the piston of the working hydraulic cylinder (2) is retracted back and lock, at this time the gripping claws (4) do not do any work, and the two holding claws (4) are fixed at the two sides of the frame (1) with the maximum distance between them; the working hydraulic motor (17) drives the flexible cleaning device base (5) rotates to drive the sweeping brush (13) in the rectangular groove (54) that has been pushed out and deployed at this time to rotate, so as to realize the flexible gravel cleaning function.

The beneficial effects of the present invention are as follows:

The invention has high integration and simple structure. It realizes the gravel cleaning function and the stone holding function on the basis of only one engineering accessory, and is different from the rigid movement integration of traditional engineering accessory. The accessory has rigidity and flexibility.

The function conversion of the present invention is realized based on the rigid holding and grasping system and the flexible cleaning system being respectively arranged outside the frame (1) and inside the cavity of the frame (1). Through the pushing out and retracting of the piston of the functional hydraulic cylinder (15) to push out the brush (13) from the cavity and brush (13) retracting, and then quickly completes the conversion between the grasping function and the cleaning function, and meets the work requirements in each working state without movement interference.

The flexible cleaning function of the present invention is realized based on the change of the sweeping and folding mechanism. When the piston of the functional hydraulic cylinder (15) is retracted, the moving guide sleeve (6) moves downward along the guide slide rail (8), that is, moves along the negative direction of z axis, thereby driving the rotating guide sleeve (9) to move down synchronously, and driving the sweeping brush (13) to be pushed out from the cavity and positioned and locked into the rectangular groove (54); the working hydraulic motor (17) drives the flexible cleaning device base (5) to rotate while working, thereby driving the sweeping brush (13) located in the rectangular groove (54) to rotate. At this time, the base rotation drives the rotating guide sleeve (9) to rotate synchronously, and the moving guide sleeve (6) remain stationary, the rotating guide sleeve (9) rotates relative to it; the dust cover (14) is fixed at the lower end of the moving guide sleeve (6), moves synchronously when the sleeve moves down, and is designed with a rectangular groove (141) to ensures the sweeping brush (13) and its positioning, which can prevent dust from entering the cavity during work, increase the working stability of the sweeping brush (13), and enhance the practicability and reliability of the accessory.

Figure 1:
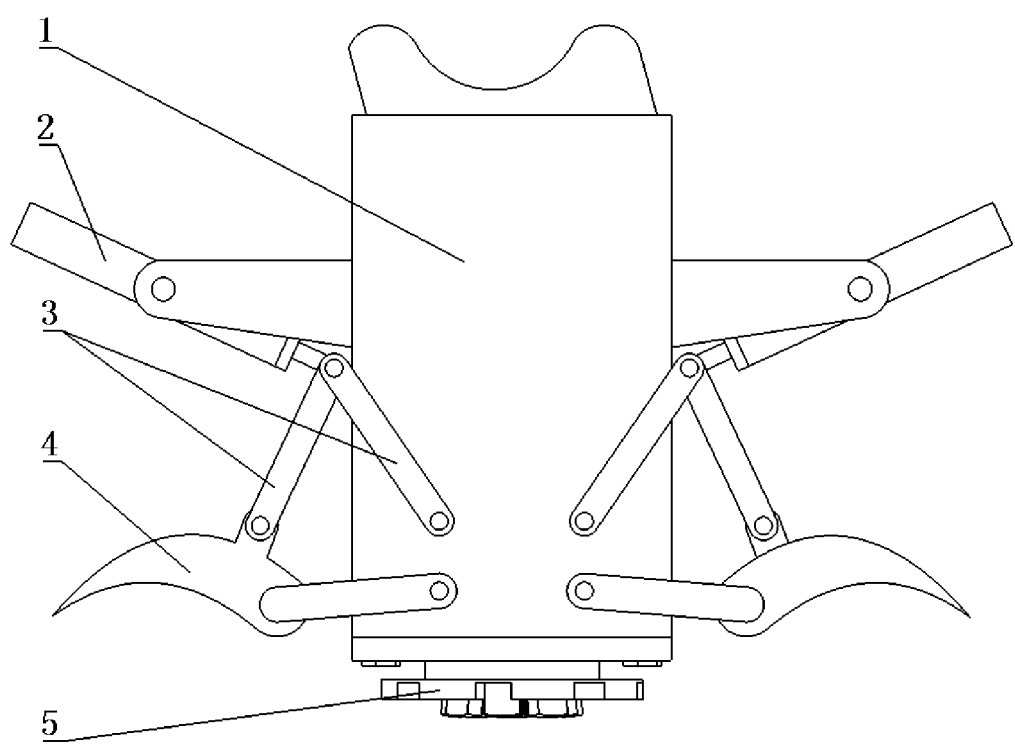
FIG. 1: The front view of the overall assembly.
Figure 2:
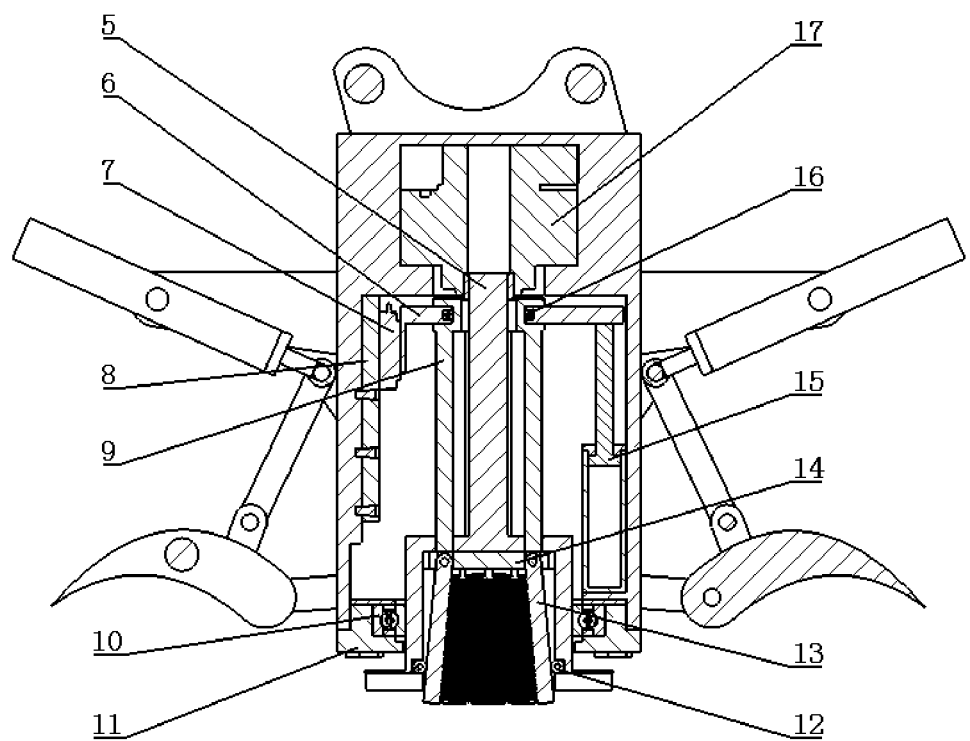
FIG. 2: Cross-sectional view of the overall assembly.
Figure 3:
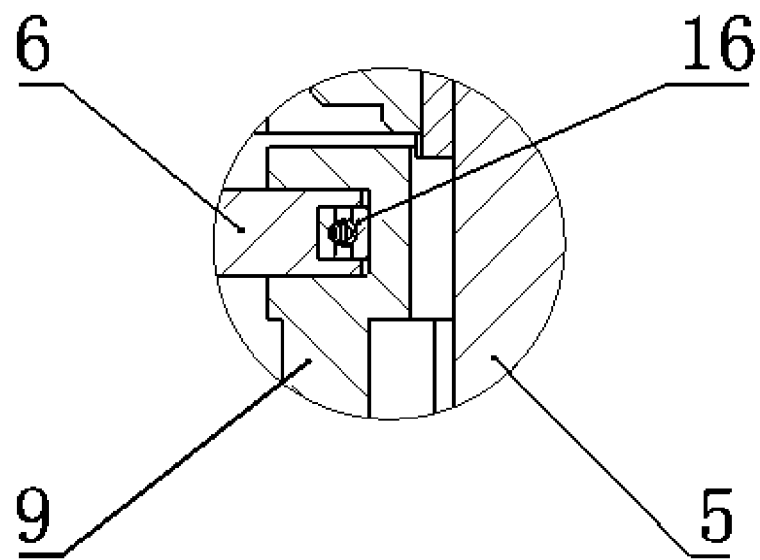
FIG. 3: A partial view of the connecting part of the guide sleeve.

Wherein: 1—frame, 2—working hydraulic cylinder, 3—holding device connecting rod, 4—gripping claw, 5—flexible cleaning device base, 6—moving guide sleeve, 7—guide sliding block, 8—guide slide rail, 9—rotating guide sleeve, 10—rotating base bearing, 11—frame box end cover, 12—cylindrical roller, 13—sweeping brush, 14—dust cover, 15—function hydraulic cylinder, 16—rotating sleeve bearing, 17—working hydraulic motor, 51—rotating shaft, 52—round hole, 53—rotating shaft spline, 54—rectangular groove, 61—slider connecting boss, 62—ring groove, 63—Hydraulic cylinder connecting boss, 91—ring groove, 92—cylindrical connecting rod, 93—round through hole, 94—pin shaft, 141—rectangular groove.

PREFERRED EMBODIMENT

The following Preferred embodiment is described below in conjunction with the drawing.

Figure 6:
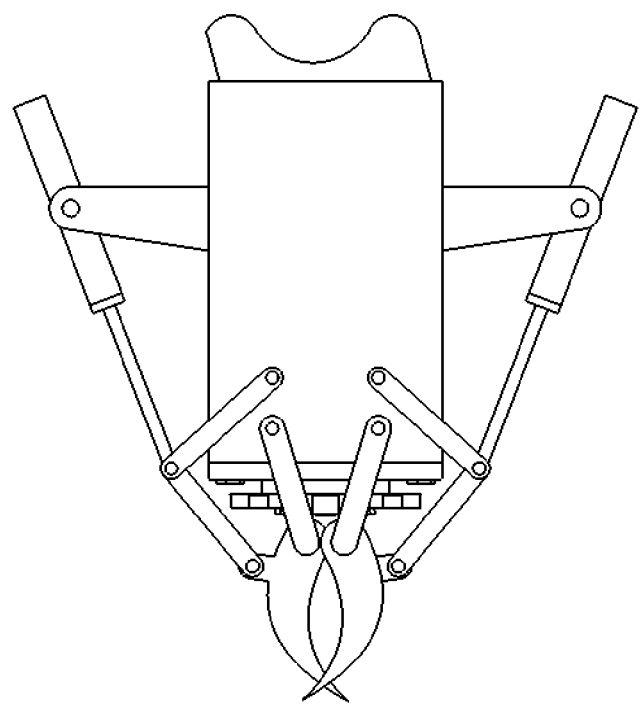
FIG. 6: The front view of the accessory when holding and grasping.
Figure 7:
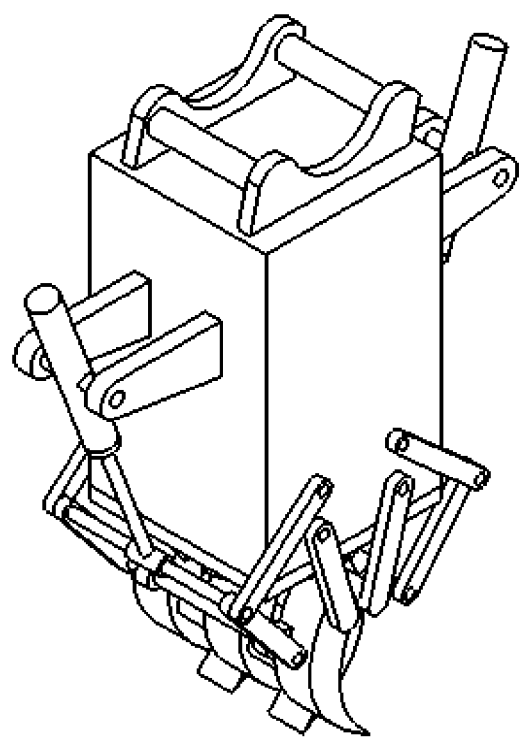
FIG. 7: Axonometric drawing of accessory when holding and grasping.
Figure 11:
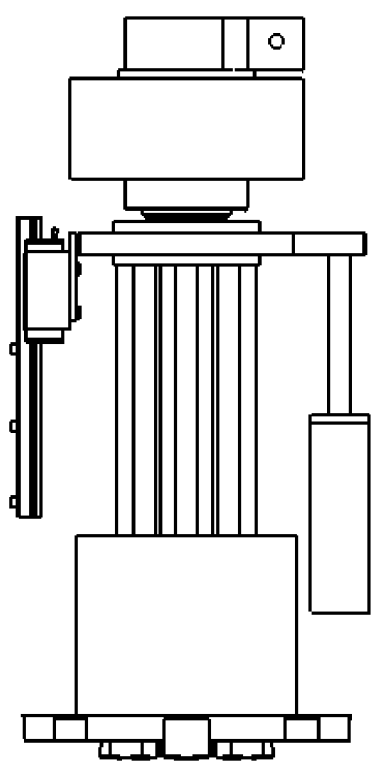
FIG. 11: The front view of the cleaning device when the brush is retracted.

Firstly, large concrete blocks are carried out on the surface of the ruins, and the working mode of the equipment is as follows: from the initial state of FIG. 1 to the holding and grasping state of FIG. 6, the working hydraulic cylinder (2) piston pushes out the holding claw (4) and grips for rigidity. The configuration of the accessory claw (4) in the holding and grasping state is shown in FIGS. 6 and 7; the internal flexible cleaning device is shown in FIGS. 11 and 12, the functional hydraulic cylinder (15) piston is locked when pushing to the maximum stroke, the guide slider (7) is now located at the upper end of the guide slider rail (8), and the sweeping brush (13) is retracted into the cavity of the flexible cleaning device base (5) to avoid Interference with gripping work.

After the large stones are transported, clean up the rubble that cannot be handled by the rigid gripping work. The working mode of the accessory is:

The working hydraulic cylinder (2) is in the contracted state and locked to restore initial state. which is shown in FIG. 1. The gripping claw (4) is open and rests on both sides of the frame (1) in the configuration shown in FIG. 1.

Figure 12:
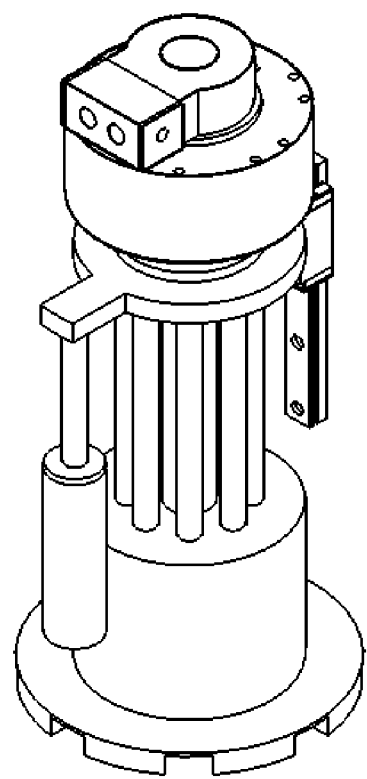
FIG. 12: Axonometric view of the sweeping device when the sweeping brush is retracted.
Figure 13:
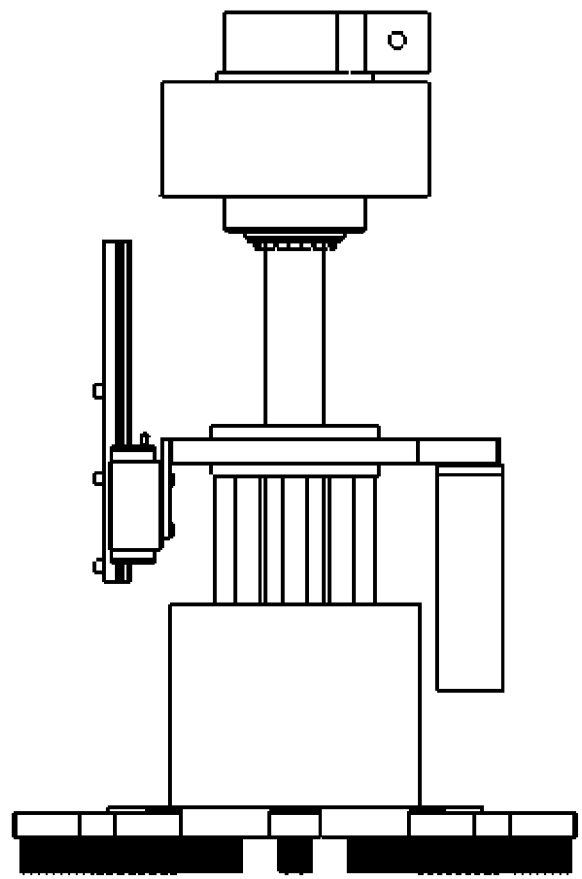
FIG. 13: The front view of the cleaning device when the brush is extended.
Figure 14:
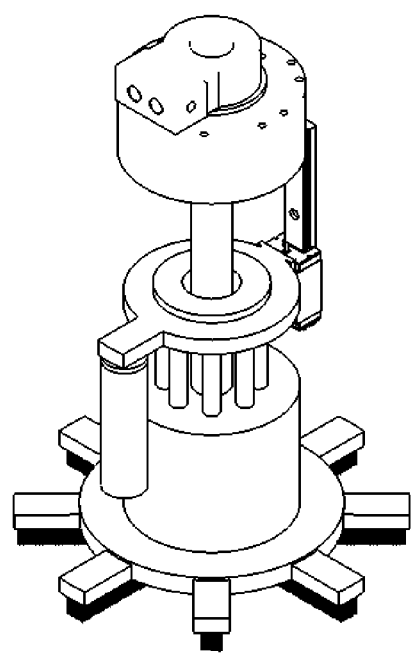
FIG. 14: Axonometric view of the sweeping device when the sweeping brush is extended.

From the retracted state of the sweeping brush in FIG. 12 to the extended state of the sweeping brush in FIG. 14, the piston of the functional hydraulic cylinder (15) retracts to the maximum stroke and locked, and the guide slider (7) moves along the guide slider rail (8) to the lower end, the moving guide sleeve (6) moves down synchronously along the guide rail direction, and the rotating guide sleeve (9) nested with the moving guide sleeve (6) moves down synchronously.

Figure 4:
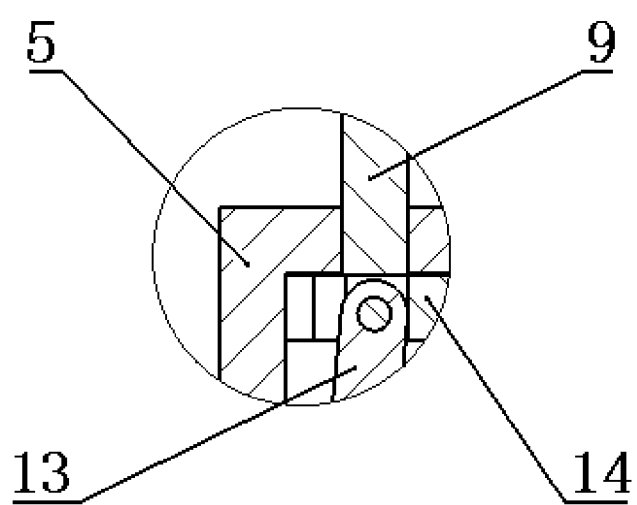
FIG. 4: A partial view of the connection of the sweeping brush.
Figure 5:
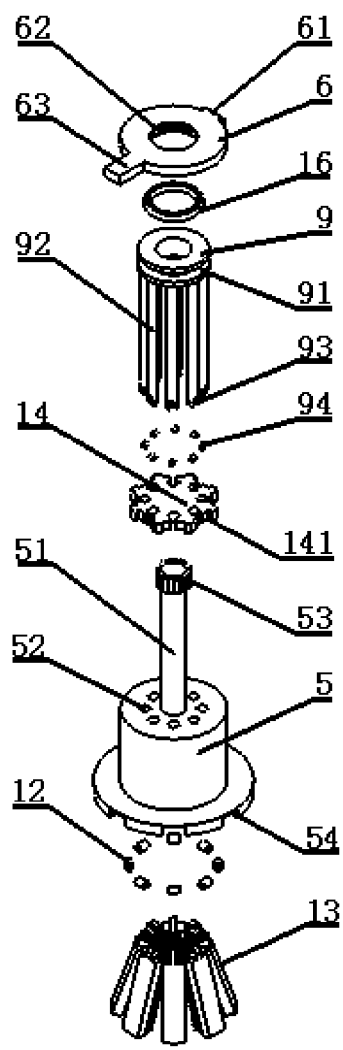
FIG. 5: Exploded view of the flexible cleaning device.
Figure 10:
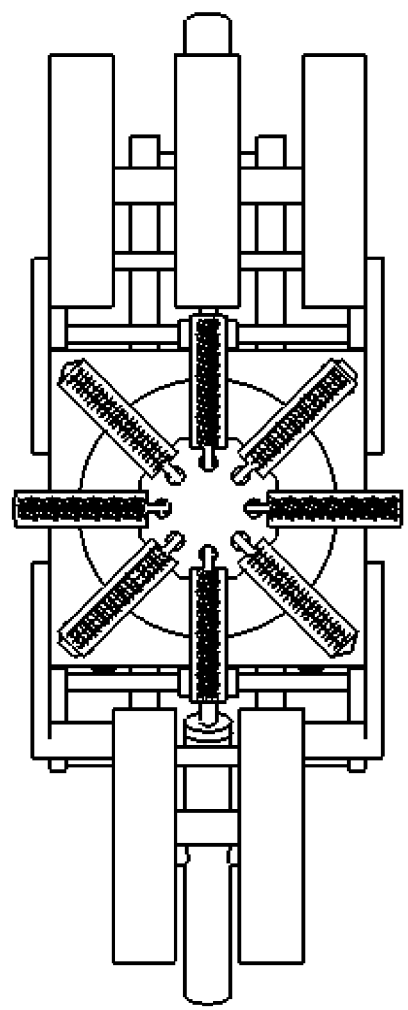
FIG. 10: The bottom view of accessory during cleaning.

As shown in FIG. 4, a torsion spring is arranged at the joint of lower columnar connecting rod between the brush (13) and the rotating guide sleeve (9). While the sweeping brush (13) and the rotating guide sleeve (9) move down synchronously, the cylinder roller (12) is compressed under the force of the torsion spring and rolled on its surface to expand; finally, as shown in FIG. 10, the sweeping brush (13) is pushed out and positioned in the rectangular groove (54) at the bottom of the flexible cleaning device base (5).

Figure 8:
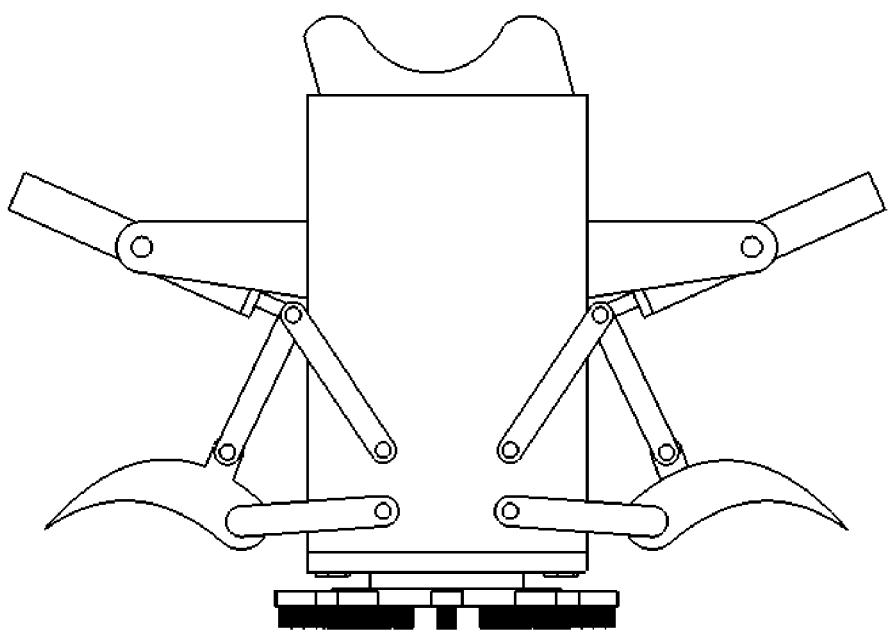
FIG. 8: Front view of accessory during cleaning.
Figure 9:
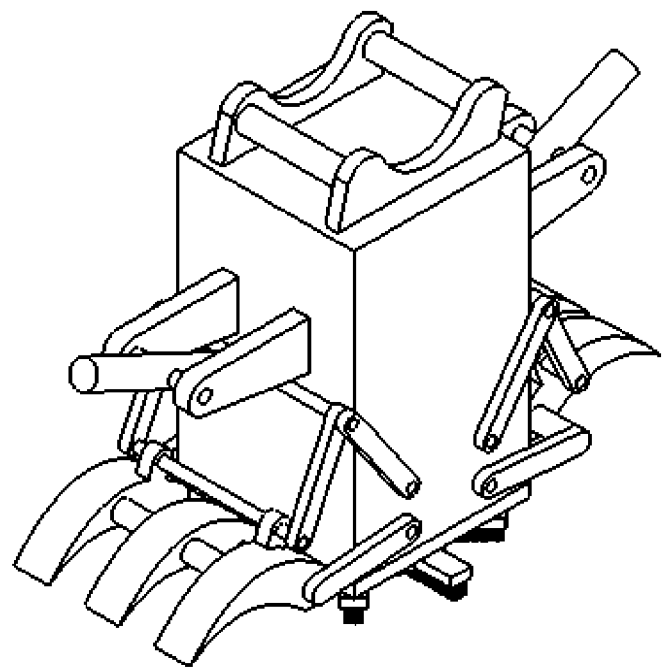
FIG. 9: Axonometric view of accessory during cleaning.

After the sweeping brush (13) is deployed and positioned, the working hydraulic motor (17) starts, and the flexible sweeping device base (5) rotates to drive the sweeping brush (13) located in the groove to move, sweeping the flexible wire brush on the surface to clean up the rubble, the working conditions are shown in FIG. 8 and FIG. 9.

We claim:

1. A multifunctional rigid-flexible operation engineering rescue accessory comprising: a frame (1), two working hydraulic cylinders (2), a functional hydraulic cylinder (15) and a working hydraulic motor (17); the cylinder (2), the functional hydraulic cylinder (15), and the working hydraulic motor (17) are used for controlling movement; the working hydraulic cylinder (2) is connected with a gripping claw (4) through a gripping device connecting rod (3);

a lower end of a flexible cleaning device base (5) is connected to the frame (1) through a frame box end cover (11) and a bearing (10), and the frame box end cover (11) fixed with an outer ring of the bearing (10), an inner ring of the bearing (10) is fixed to the outside of the lower end of the flexible cleaning device base (5), and a lower part of the frame box end cover (11) is bolted to the frame (1); a shaft (51) of the flexible cleaning device base (5) passes through a hole in a center of a rotating guide sleeve (9), and connect with the working hydraulic motor (17) through a shaft spline (53); a cylindrical roller (12) is connected with the flexible cleaning device base (5), and arranged in a circular curve; a cylindrical connecting rod (92) at a lower end of the rotating guide sleeve (9) passes through a circular hole (52) and is connected to a sweeping brush (13); a connecting rod through hole (93) is connected to the sweeping brush (13) through a pin shaft to form a rotating pair, and a torsion spring is designed at the junction, the sweeping brush (13) is pressed on a surface of the cylindrical roller (12) through an external force provided by the torsion spring; a rotating sleeve bearing (16) is installed between the moving guide sleeve (6) and the rotating guide sleeve (9), an outer ring of the rotating sleeve bearing (16) is fixedly installed in an annular groove (62) of the moving guide sleeve (6), and an inner ring of the rotating sleeve bearing (16) is fixedly installed in an annular groove (91) of the rotating guide sleeve (9); a slider connecting boss (61) is fixed with a guide slider (7) by screws; a guide slider rail (8) is fixed on the frame (1) by bolts;

the guide slider (7) is connected with the guide slider rail (8) to form a moving pair; a hydraulic cylinder connecting boss (63) of the moving guide sleeve (6) is fixedly connected with a piston rod of the functional hydraulic cylinder (15); a dust cover (14) is fixedly connected with the cylindrical connecting rod (92) at the lower end of the rotating guide sleeve (9) through a circular through hole on the surface; the functional hydraulic cylinder (15) is fixedly installed inside a cavity of the frame (1) by bolts; the working hydraulic motor (17) installed on a boss between an upper cavity and a lower cavity of the frame (1) by bolts.

2. A multifunctional rigid-flexible operation engineering rescue accessory according to claim 1, wherein when a piston of the functional hydraulic cylinder (15) is pushed out, the moving guide sleeve (6) is pushed upward along a positive direction of z-axis, thereby driving the rotating guide sleeve (9) to move upwards synchronously, and driving the sweeping brush (13) into the cavity of the frame; when the piston of the functional hydraulic cylinder (15) is retracted, the functional hydraulic cylinder (15) drives the moving guide sleeve (6) to move downward along a negative direction of z-axis, thereby driving the rotating guide sleeve (9) to move down synchronously, and driving the sweeping brush (13) to be pushed out from the cavity of the frame; the working hydraulic motor (17) drives the flexible cleaning device base (5) of a sweeping device rotates, thereby driving the sweeping brush (13) located in a rectangular groove (54) to rotate; the rotation of the flexible cleaning device base (5) drives the rotating guide sleeve (9) to rotate synchronously; at this point, the moving guide sleeve (6) is fixed and stationary, while the rotary guide sleeve (9) rotates relative to the moving guide sleeve (6).

3. A multifunctional rigid-flexible operation engineering rescue accessory according to claim 1, wherein frame (1) is a cuboid and designed with two cylindrical cavities, upper cylindrical cavity and lower cylindrical cavity, directions of the two cylindrical cavities are along the z-axis; the upper cylindrical cavity is used to arrange the working hydraulic motor (17), the lower part of upper cylindrical cavity connects the lower cylindrical cavity; the lower cylindrical cavity is used to arrange the flexible cleaning device base (5), the flexible cleaning device base (5) connects with the working hydraulic motor (17), the lower part of the lower cylindrical cavity passes through the frame (1) to ensure that the sweep brush (13) can be pushed out of the frame (1), the lower cylindrical cavity is designed with bosses on opposite sides in y-axis direction to install the guide slide rail (8) and the functional hydraulic cylinder (15); a top of the cuboid is designed with two bosses which are connected by two crossbars along x direction for connecting with a quick changeover joint; two bosses along the y-axis direction are designed on both sides of the cuboid; a center of the two bosses is reserved with a rectangular groove, respectively, to ensure moving space of the working hydraulic cylinders (2); both sides of the two bosses are designed with through holes along the X axis for installing the working hydraulic cylinder (2).

4. A multifunctional rigid-flexible operation engineering rescue accessory according to claim 1, wherein the flexible cleaning device base (5) is composed of three cylinders; an upper cylinder, a middle cylinder and a lower cylinder, with different diameters and heights; center lines of the three cylinders are on the same line along the z-axis; the upper cylinder is used as the rotating shaft (51) to connect flexible cleaning device base (5) and the working hydraulic motor (17), the rotating shaft (51) is designed with splines (53); the middle cylinder is designed with eight through holes (52) for fixing the connecting rod (92) of the rotating guide sleeve (9), the middle cylinder is designed with a cylindrical cavity used for placing the retracted sweeping brush (13), the retracted sweeping brush (13) is projected as a regular octagon in z-axis direction; the lower cylinder is a cylindrical cavity structure, and a bottom of the lower cylinder is designed with eight rectangular grooves (54) for fixing the sweeping brush (13) that extends after the cleaning work starts; cylindrical rollers (12) are installed at junction of the grooves (54) and internal cylindrical cavity.

5. A multifunctional rigid-flexible operation engineering rescue accessory according to claim 1, wherein the movable guide sleeve (6) is a cylindrical ring structure, a center of the cylindrical ring structure is designed with a circular through hole along the z-axis direction, and an inner side of the circular through hole is designed with an annular groove (62), and a plane of the annular groove is perpendicular to the z-axis; two hydraulic cylinder connecting bosses (63) are designed on opposite sides of the movable guide sleeve along the y-axis direction; the hydraulic cylinder connecting bosses (63) extend outward from the right side of the moving guide sleeve (6) along the positive direction of the y-axis, and are designed with grooves to connect with the functional hydraulic cylinder (15); the slider connecting boss (61) extends downward from the left side of the moving guide sleeve (6) along the negative direction of the z-axis, and is designed with a through hole for connecting with the guide slider (7).

6. A multifunctional rigid-flexible operation engineering rescue accessory according to claim 1, wherein the rotating guide sleeve (9) is a cylindrical ring structure, a center of the cylindrical ring structure is designed with a circular through hole along the z-axis direction; the outer side of the cylindrical ring structure is designed with an annular groove (91) for mounting the bearing, and a plane of the annular groove (91) is perpendicular to the z-axis; a bottom of the cylindrical ring structure is designed with eight cylindrical connecting rods (92) along the z-axis for connecting the sweeping brushes (13), and the eight cylindrical connecting rods (92) are evenly distributed on a circumference of the cylindrical ring structure to rotate the guide sleeves (9); a bottom of each cylindrical connecting rod (92) is designed with a circular through hole (93) for installing the sweeping brush (13).

7. A multifunctional rigid-flexible operation engineering rescue accessory according to claim 1, wherein the frame box end cover (11) of the box body is a sheet-shaped cuboid, a center of the cuboid is designed with a circular through hole along the z-axis direction, and an upper surface of the cuboid is designed with an annular boss for mounting and fixing the bearing; the dust cover (14) is octagon column, a center of each edge of the octagon column is designed with a rectangular groove (141) to fix the sweeping brush (13) that protrudes from the cavity during work; an inner edge of the groove (141) is designed with a circular through hole; the sweeping brush (13) is a rectangular parallelepiped, and its surface is covered with a flexible steel wire brush.

8. A multifunctional rigid-flexible operation engineering rescue accessory according to claim 1, wherein the torsion spring is arranged at a joint of a lower columnar connecting rod between the brush (13) and the rotating guide sleeve (9); while the sweeping brush (13) and the rotating guide sleeve (9) move down synchronously, the cylindrical roller (12) is compressed under the force of the torsion spring and rolled on its surface to expand; finally, the sweeping brush (13) is pushed out and positioned in a rectangular groove (54) at the bottom of the flexible cleaning device base (5); the moving guide sleeve (6) and the rotary guide sleeve (9) are nested with each other and the rotating sleeve bearing (16) is installed between the moving guide sleeve (6) and the rotary guide sleeve (9), which can move synchronously and relatively; the dust cover (14) and a lower end of the moving guide sleeve (6) are fixed, and move synchronously when the moving guide sleeve moves downward.

9. A multifunctional rigid-flexible operation engineering rescue accessory according to claim 1, wherein:
   the accessory can function as a rigid gripping device A or a flexible cleaning device B;
   when working as the rigid gripping device A, the piston of the functional hydraulic cylinder (15) is pushed out and locked, the sweeping brush (13) is retracted and hidden in a cavity of the flexible cleaning device base (5), and a piston of the working hydraulic cylinder (2) is pushed out to provide the power pushing a connecting shaft move to drive a four-bar mechanism composed of the gripping claw (4) and the gripping device connecting rod (3); the gripping claw (4) moves in a curve until two holding claws grasp together, and does not intersect with a protruding part at the bottom of the flexible cleaning device base (5), so as to realize the rigid holding and grasping function of stones;
   when working as the flexible cleaning device B, the piston of the functional hydraulic cylinder (15) is retracted and locked, the sweeping brush (13) is pushed out and expanded from the cavity of the flexible cleaning device base (5); the piston of the working hydraulic cylinder (2) is retracted back and locked, at this time the gripping claw (4) does not do any work, and two holding claws (4) are fixed at the two sides of the frame (1) with maximum distance between them; the working hydraulic motor (17) drives the flexible cleaning device base (5) rotates to drive the sweeping brush (13) in a rectangular groove (54) that has been pushed out and deployed at this time to rotate, so as to realize the flexible gravel cleaning function.

* * * * *